US005470176A

United States Patent [19]
Corcoran et al.

[11] Patent Number: 5,470,176
[45] Date of Patent: * Nov. 28, 1995

[54] SYSTEM AND METHOD FOR CONTROLLING EMISSIONS CREATED BY SPRAYING LIQUIDS FROM MOVING VEHICLES

[75] Inventors: John Corcoran, Los Angeles; Ikbal A. Molvi, Hawthorne; Joseph W. Hower, Long Beach; William A. Moseley, Redondo Beach, all of Calif.

[73] Assignee: Manhole Adjusting Contractors Inc., Monterey Park, Calif.

[*] Notice: The portion of the term of this patent subsequent to Aug. 30, 2011, has been disclaimed.

[21] Appl. No.: 248,501

[22] Filed: May 19, 1994

Related U.S. Application Data

[63] Continuation-in-part of Ser. No. 163,937, Dec. 8, 1993, Pat. No. 5,342,143, which is a continuation of Ser. No. 748, Jan. 5, 1993, Pat. No. 5,297,893.

[51] Int. Cl.[6] .......................... B01D 45/00; E01C 23/00
[52] U.S. Cl. ................... 404/72; 55/302; 55/320
[58] Field of Search .................... 404/72, 87, 110; 55/320, 315, 429, 500, 302

[56] References Cited

PUBLICATIONS

Flynn, Larry, "Public/Private Partnership Studies Ways to Reduce Asphalt Fumes", *Roads & Bridges*, pp. 34–35, May 1995.

Primary Examiner—William P. Neuder
Attorney, Agent, or Firm—Nilsson, Wurst & Green

[57] ABSTRACT

A system and a method for controlling emissions caused by spraying a heated liquid paving composition from a moving vehicle make use of a vacuum hood mountable to the vehicle and a fan for creating a partial vacuum within the hood to draw air containing emissions into the hood for collection. A filter or other suitable apparatus is used to extract emissions before the air is discharged to the atmosphere. In a preferred embodiment, a subsystem directs air toward a region containing emissions to cool the pavement surface or control dispersion. A shroud structure may also be provided to confine the emissions during collection. In another embodiment, a fine spray of water or moist air is directed toward the emissions area.

39 Claims, 9 Drawing Sheets

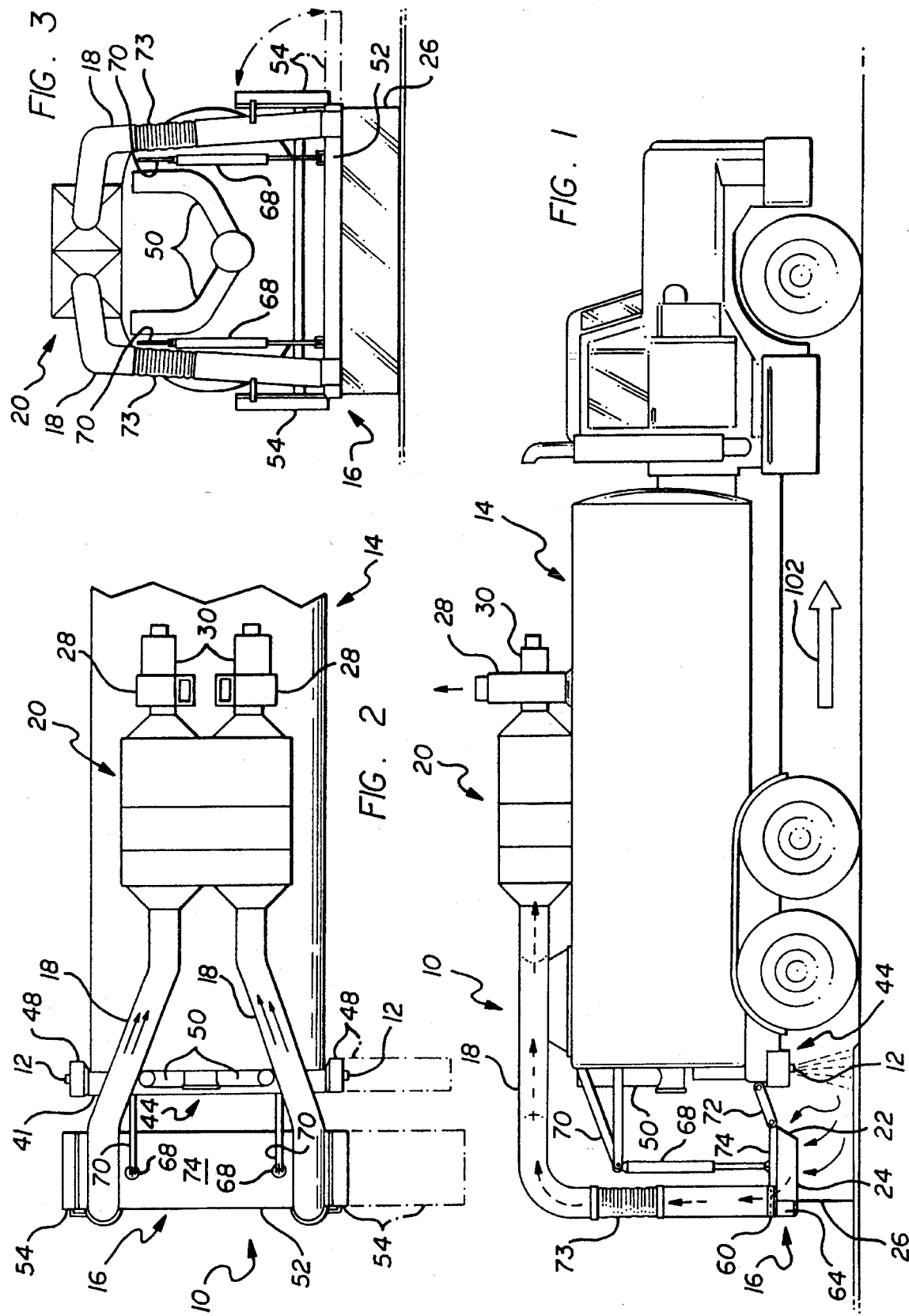

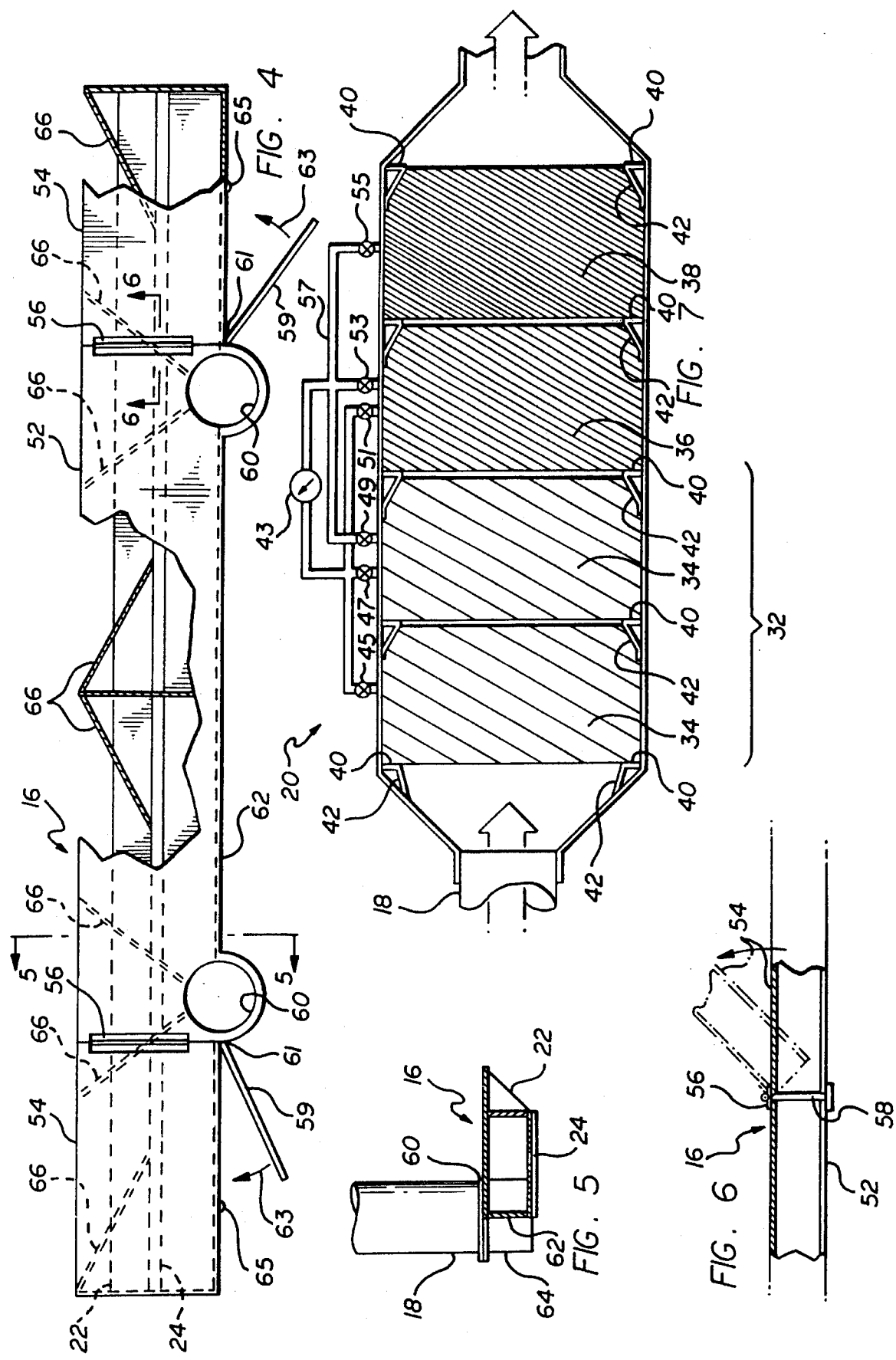

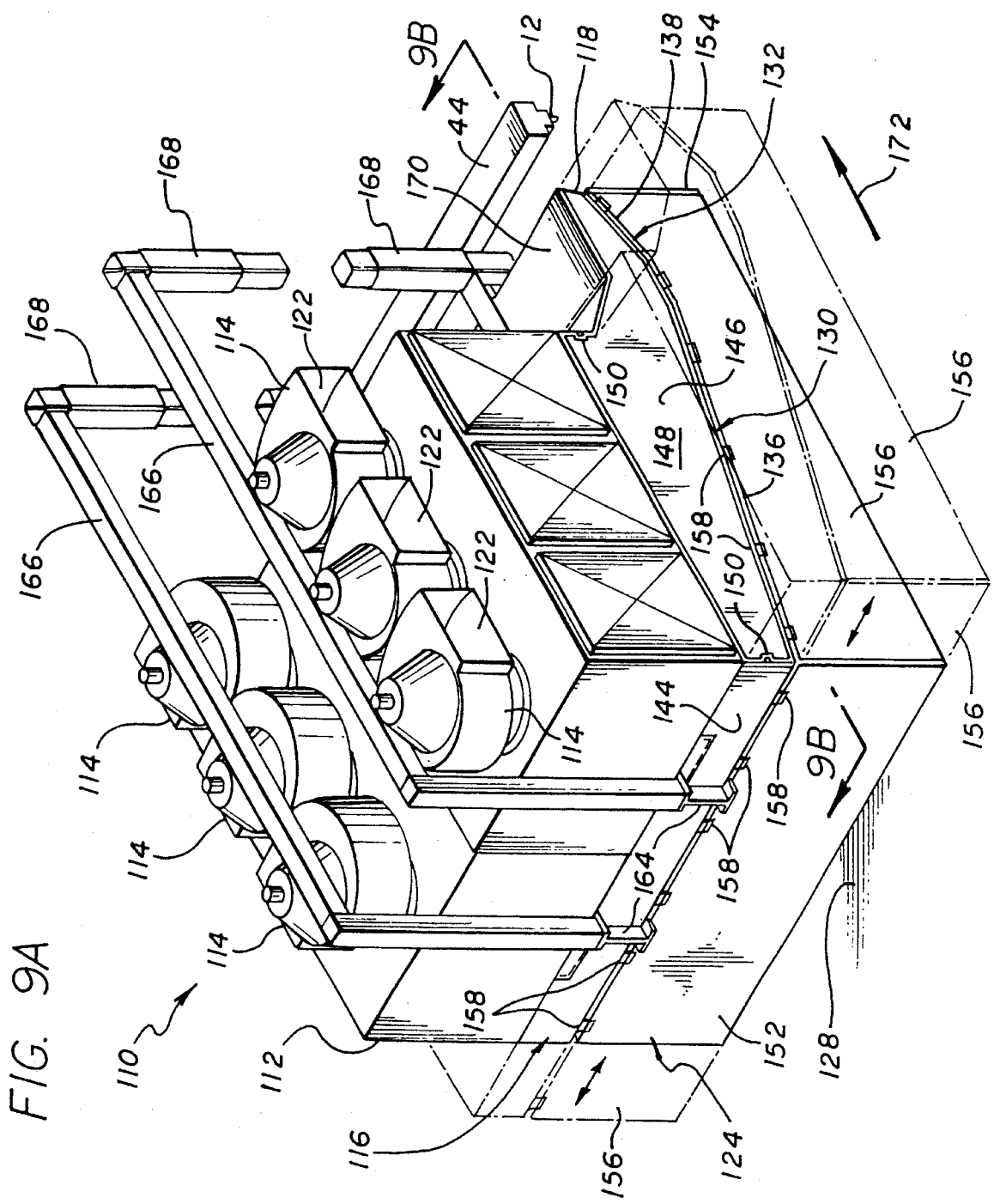

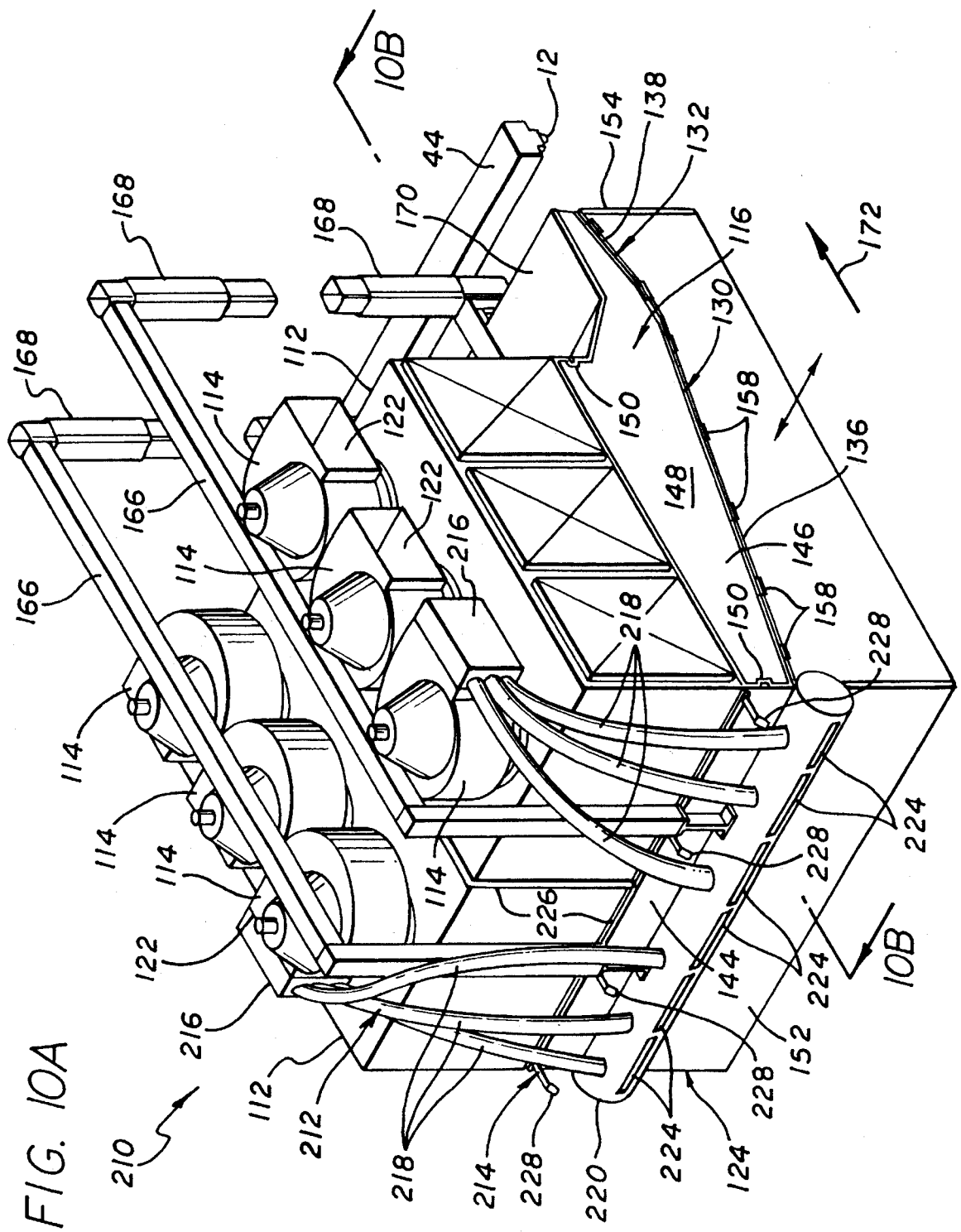

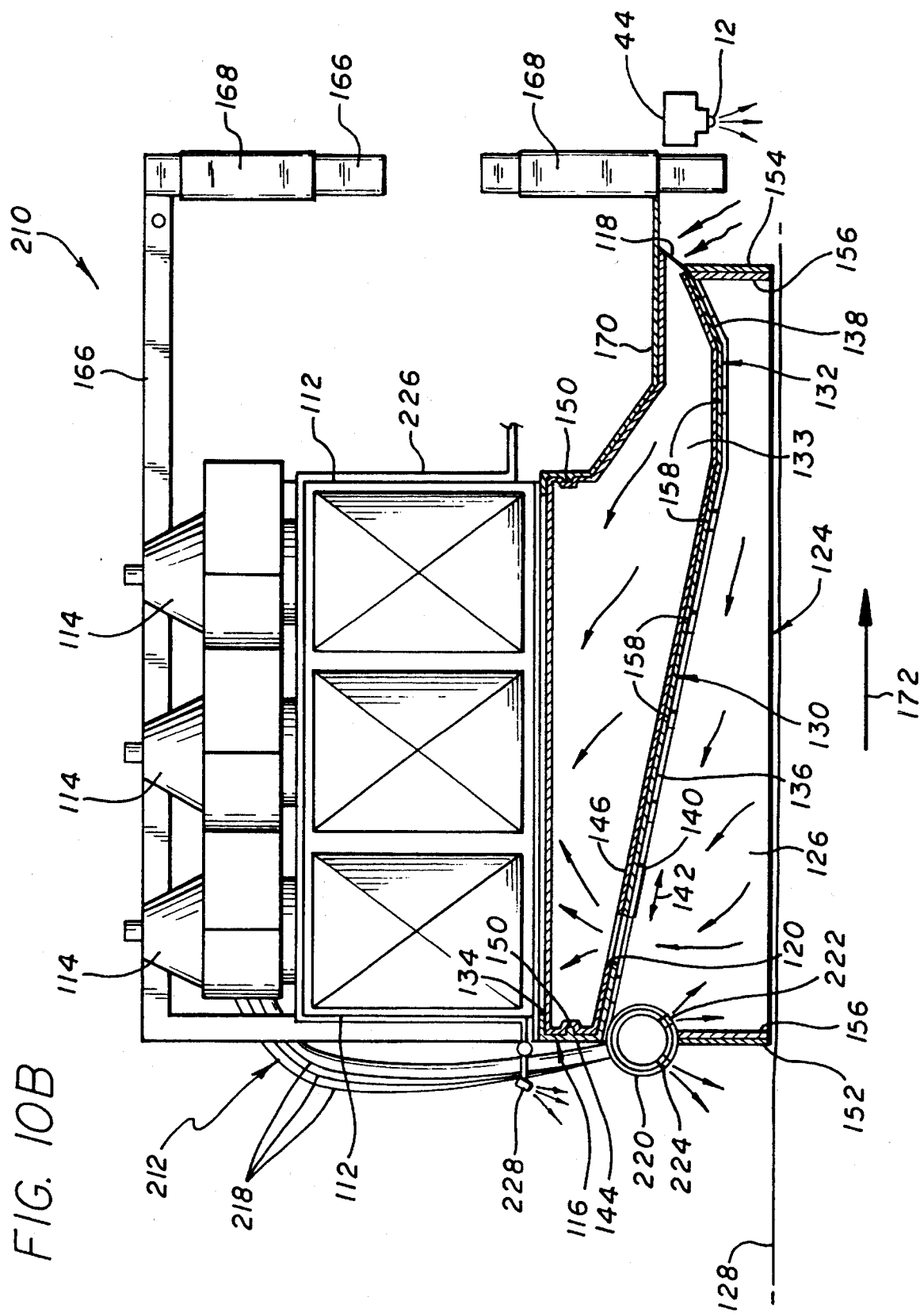

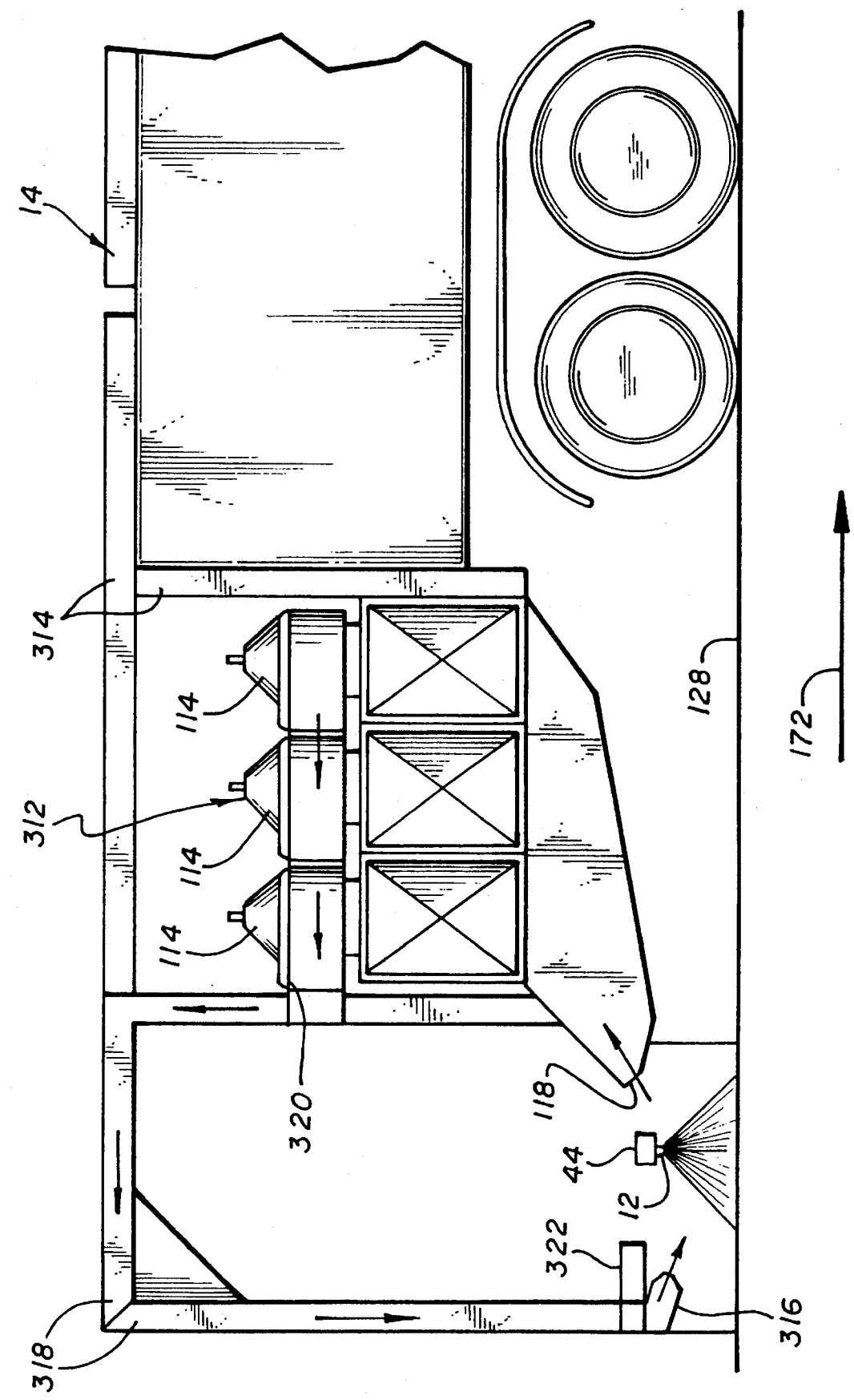

SYSTEM AND METHOD FOR CONTROLLING EMISSIONS CREATED BY SPRAYING LIQUIDS FROM MOVING VEHICLES

BACKGROUND OF THE INVENTION

This is a continuation-in-part of application Ser. No. 08/163,937, filed Dec. 8, 1993, now U.S. Pat. No. 5,342,143, which itself is a continuation of application Ser. No. 08/000,748, filed Jan. 5, 1993, now U.S. Pat. No. 5,297,893 issued Mar. 29, 1994.

In recent years, asphalt paving oil mixed with recycled rubber has emerged as a preferred paving material because of its superior physical properties and its potential as a solution to a major environmental problem: the disposal of scrap automobile and truck tires. A popular process for the use of such material is described in U.S. Pat. No. 3,891,585 and U.S. Pat. No. 4,069,182, both issued to Charles H. McDonald, the specifications of which are hereby incorporated by reference. According to a current form of this process, recycled crumb rubber obtained from scrap automobile tires is mixed with paving grade liquid asphalt (usually AR 4000) at a temperature of approximately 400 degrees F. (199 degrees C.) to form a jellied composition of "asphalt-rubber" which is sprayed at 385–400 degrees F. (189–199 degrees C.) in quantities of approximately 0.55–0.65 gallons per square yard (2.5–2.9 liters per square meter) of pavement or used as a binder in hot mix asphalt (HMA).

A thick cloud of visible emissions is released into the air when hot asphalt-rubber is sprayed onto a pavement surface. These emissions result from the hot liquid coming into contact with the surrounding air and then contacting the pavement itself, both of which are much cooler than the liquid. The emissions produced in applying asphalt-rubber are much greater than those produced by spraying most other materials because non-rubberized materials are typically applied in smaller quantities and/or at lower temperatures. In contrast to asphalt-rubber, a tack coat of conventional paving grade oil is applied in quantities of only approximately 0.05–0.10 gallons per square yard (0.2–0.4 liters per square meter), and conventional prime coat oil is applied at temperatures of only approximately 150–180 degrees F. (63–82 degrees C.).

Although emissions from the spraying of asphalt-rubber compositions have not been shown to be harmful medically, they do present an "opacity" problem at the point of application due to more stringent air quality regulations adopted in recent years. This was investigated by Roberts Environmental Services of West Covina, California and is discussed in a document entitled "The Asphalt-Rubber Producers Group Ambient Air Sampling Program" (June 1989), which reports opacity readings of up to 90% at locations downwind of mobile asphalt-rubber operations.

Prior efforts to reduce emissions in the asphalt industry have focussed on devices for collecting emissions from substantially stationary sources, such as delivery trucks as they are being filled with hot mix asphalt (HMA), or on complex machines which mill, rejuvenate and reapply asphalt pavement in a slow, relatively enclosed process known as asphalt heater scarification/recycling. These systems have not been proposed for mobile spraying operations, however, and are not suitable for liquid asphalt-rubber applications.

Therefore, it is desirable in many instances to reduce or eliminate emissions from a mobile asphalt-rubber application process.

SUMMARY OF THE INVENTION

A large proportion of the emissions produced by spraying heated liquids onto a pavement surface are collected efficiently and inexpensively by the system and method of the present invention without disrupting the continuity of the spraying process or affecting the quality of the treated surface. This is accomplished with a vacuum hood mounted to a distributor vehicle adjacent a row of nozzles through which the liquid is sprayed. A fan or other mechanism draws emissions-containing air away from the area of the nozzles and passes it through a filter or other suitable apparatus where the emissions are removed. Efficiency of the collection process is enhanced in a preferred embodiment of the invention by providing the hood with a large primary opening adjacent its forward end and a secondary opening, which may be a slot, a suitable distance behind the primary opening. In a further embodiment, air and/or water is directed toward the area of the emissions to cool the pavement surface, control dispersion, or extract emissions from the air. A shroud structure may also be provided to confine the emissions during collection, and a fine spray of water or stream of moist air may be directed toward the area containing the emissions.

Accordingly, a system and a method for controlling emissions created by spraying heated liquid paving composition from at least one nozzle of a moving vehicle involve: a vacuum hood positionable adjacent the nozzle and having at least one inlet and at least one outlet; a shroud structure associated with the vacuum hood to at least partially enclose an emissions collection region above the pavement surface; a fan or other mechanism communicating with the outlet to create a partial vacuum within the vacuum hood and draw air containing emissions through the inlet; and apparatus for receiving the air and extracting emissions therefrom. In a preferred embodiment, the system includes at least one fluid conduit having a discharge portion for directing pressurized air or a fine mist of water substantially toward an emissions-containing region.

BRIEF DESCRIPTION OF THE DRAWINGS

The above and other features of the present invention may be more fully understood from the following detailed description, taken together with the accompanying drawings, wherein similar reference characters refer to similar elements throughout and in which:

FIG. 1 is a side elevational view of a truck for spraying asphalt-rubber material, the truck being outfitted with a system constructed according to a preferred embodiment of the present invention for controlling emissions created by the spraying process;

FIG. 2 is a top plan view of the truck and system of FIG. 1, shown with the side extensions of the vacuum hood in their stowed positions;

FIG. 3 is a rear elevational view of the truck and system of FIG. 2;

FIG. 4 is an enlarged top plan view of the vacuum hood of the emissions-control system of FIG. 1, shown in isolation with a portion of its upper wall broken away;

FIG. 5 is a vertical sectional view taken along the line 5—5 of FIG. 4 and showing a fragmentary portion of an air duct attached thereto;

FIG. 6 is an enlarged fragmentary vertical sectional view taken along the line 6—6 of FIG. 4;

FIG. 7 is an enlarged cross-sectional view of a filter structure contained in the emissions control system of the present invention;

FIG. 9A is a perspective view of a system constructed according to another preferred embodiment of the present invention, the system being shown behind a spray bar of an associated truck but with the truck itself omitted for clarity;

FIG. 10A is a perspective view of a system constructed according to yet another preferred embodiment of the present invention;

FIG. 10B is a vertical sectional view taken along the line 10B–10B of FIG. 10A;

FIG. 11A is a fragmentary side elevational view of a system constructed according to yet another preferred embodiment of the invention and mounted to the rear of a spray vehicle.

DESCRIPTION OF THE PREFERRED EMBODIMENTS

Figure 9B:
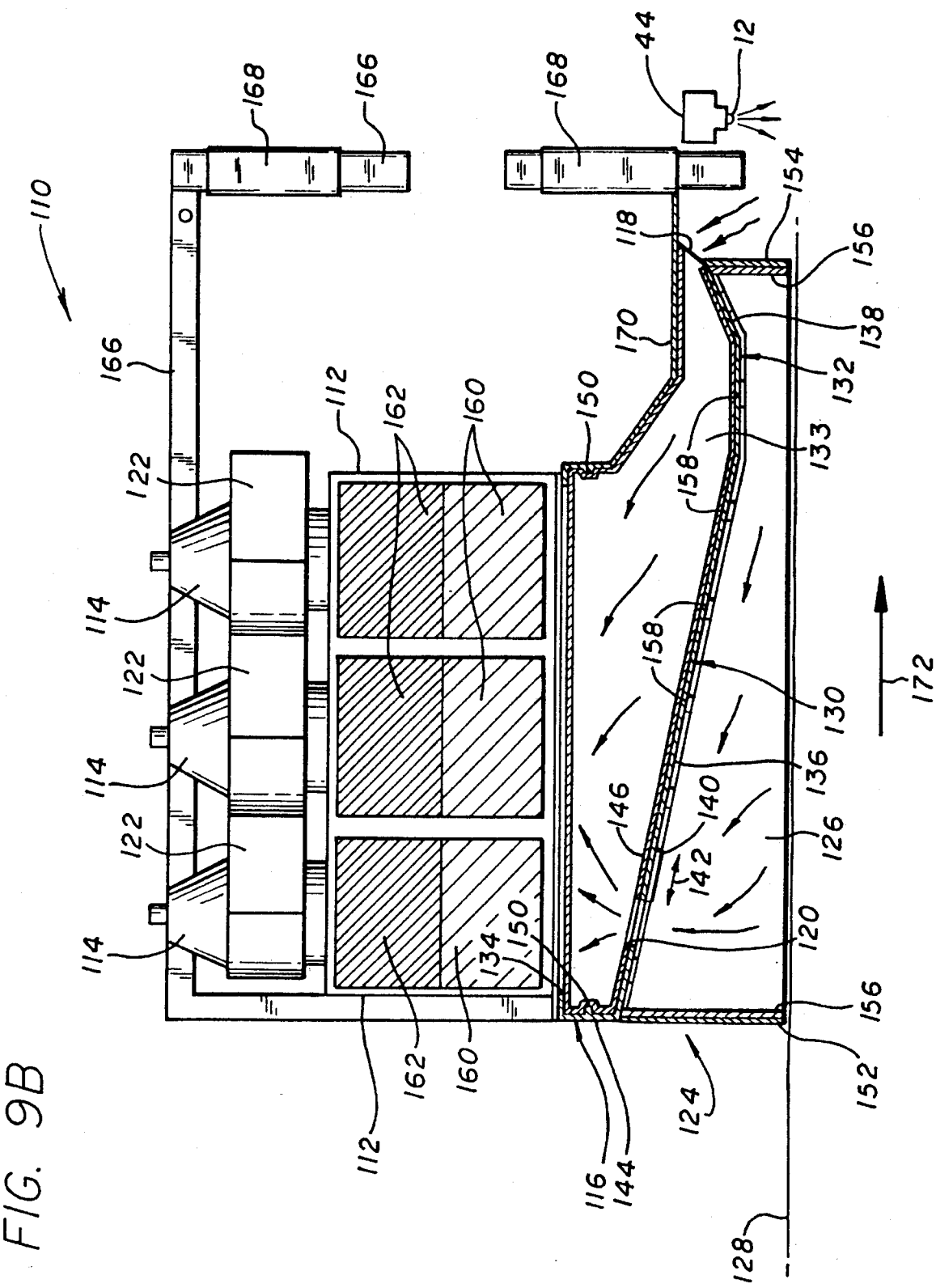
FIG. 9B is a vertical sectional view taken in the direction 9B—9B of FIG. 9A.
Figure 11B:
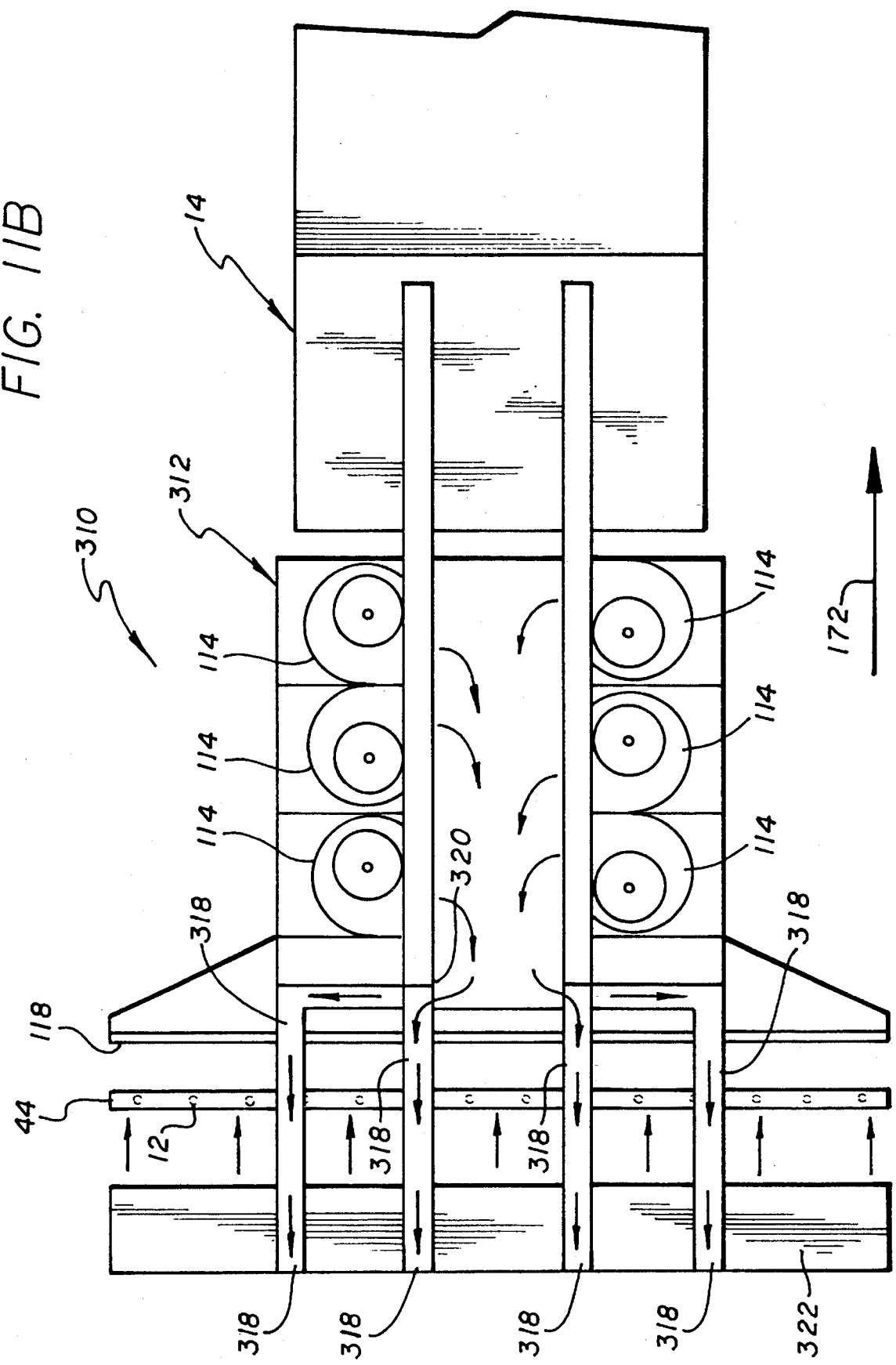
FIG. 11B is a fragmentary top plan view of the system of FIG. 11A.

Referring now to the drawings, a number of emissions control systems constructed according to the present invention are illustrated. FIGS. 1, 2 and 3, for example, illustrate a system 10 constructed according to a first embodiment of the invention for controlling emissions created by spraying heated asphalt-rubber compositions or other suitable liquids from a plurality of nozzles 12 of a distributor truck 14. FIGS. 9A and 9B illustrate a different system 110, the principal components of which are suspended from the rear of the distributor truck 14 at a location behind the spray nozzles 12. The system 110 is also expandable laterally in telescopic fashion, depending on the width over which material is to be sprayed, and has a shroud which at least partially isolates a primary emissions-containing region for evacuation of air therefrom. FIGS. 10A and 10B depict a system 210 which is similar to the system 110 but also has a plurality of fluid conduits for directing streams of air substantially toward the emissions-containing region to assist in the collection process. These air streams operate to "push" emissions into the system for efficient collection of emissions and/or disperse uncollected emissions. The system 210 also has a plurality of water nozzles and a water spray system for directing a fine spray of water or stream of moist air toward the emissions area. Finally, FIGS. 11A and 11B depict a system, identified as 310, having a suction hood ahead of the spray nozzles in the direction of vehicle travel and an air discharge portion behind the nozzles. The system 310 acts to force fresh air toward the emissions as it draws them into a collection apparatus.

Although asphalt-rubber placement is described herein as a preferred environment for use of the systems 10, 110, 210 and 310, the disclosed systems are also useful in applying other pavement-grade liquids which give off emissions. Examples of such liquids include hot spray applied AR 8000, AR8 or any other pavement grade oil, either alone or in combination with a further constituent, such as crumb rubber or a synthetic polymer.

With reference specifically to FIGS. 1, 2 and 3, the emissions control system 10 has a vacuum hood 16 disposed behind the nozzles 12 to collect air containing emissions from the spraying operation and pass the air upwardly through ductwork 18 to a filter package 20. The vacuum hood 16 has a primary opening 22 which serves as an inlet at its forward end to collect the majority of airborne emissions and an auxiliary opening 24 located behind the primary opening for collecting secondary emissions produced as the sprayed liquid cools. A flexible flap 26 is disposed behind the auxiliary opening 24 to maximize the flow of air produced by the system in the area directly behind the nozzles 12.

The air flow of the emissions control system 10 is created by a mechanism which may be a pair of fans 28 positioned downstream of the filter package 20 so that they are not exposed to contaminated air. When the mechanisms are fans, they may be driven by hydraulic motors 30 to provide a total system air flow of between 2000 and 6000, and preferably approximately 4000, cubic feet per minute (cfm).

The filter package 20, which is seen most clearly in FIG. 7, actually has three different "stages" capable of acting together to extract emissions from the collected air over an extended period without becoming clogged with sticky asphalt-rubber material. The filter package 20 is actually two filter assemblies located side-by-side, each assembly being fed by one of the fans 28. Within each side of the filter package, a first stage 32 is formed of two metal mesh filters 34 placed in series to extract relatively large contaminants (10 microns and above) and prevent them from clogging or "loading" the subsequent filter stages. The metal mesh filters 34 have the advantage that they can be cleaned and reused. A second stage 36 is a disposable paper filter rated 90–95% efficient for particles one micron or larger. A final stage 38, which is optional, is a High Efficiency Particulate Air Filter (HEPA) rated 99.5% efficient in removing particles 0.3 microns and larger.

As shown in FIG. 7, the individual filters of the package 20 are slidable between tracks 40 for ease of removal and installation. A series of inclined baffles 42 are provided directly upstream of these tracks to direct contaminated air away from the tracks and thereby prevent the buildup of bituminous material along the track surfaces.

In the course of operating the system 10, it is important to monitor the pressure across the filter elements so they can be cleaned or replaced before they hamper system performance. Thus, a pressure gauge 43 (FIG. 7) is connectable across any one or more of the filter elements through valves 45–55 of a gauge manifold 57. Taking the final stage 38 as an example, the pressure across it is displayed at the gauge 43 when valves 51 and 55 are open and the other valves are closed. Alternatively, a dedicated gauge can be connected directly across one or more of the filter stages to provide a constant pressure readout.

Referring again to FIGS. 1–3, the truck 14 is a conventional distributor truck of the type used to spray hot bituminous material, such as asphalt-rubber pavement compositions, onto pavement surfaces. The truck 14 has a distributor bar 44 made up of a main portion 46 and a pair of side arms 48 with distributor nozzles 12 on their underside. The side portions 48 are normally in the horizontal position while spreading, but can be moved upwardly to the vertical "stowed" position illustrated in full lines in FIGS. 2 and 3 when it is desired to spray a narrower pattern or when the truck is moved between jobs. As understood by those skilled in the art, the distributor truck 14 contains a heater for the liquid sprayed. The heater is vented through a pair of vent pipes 50.

The vacuum hood 16, like the distributor bar 44, has a main portion 52 extending transversely across the width of the truck and a pair of side portions 54 pivotable between a vertical "stowed" position (shown in full lines in FIGURES 2 and 3) and a horizontal operating condition (shown in phantom lines at the right hand side of FIGS. 2 and 3).

The structure of the vacuum hood 16 is illustrated in more detail in FIGS. 4, 5 and 6, in which the side portions 54 are shown in the horizontal condition. As seen most clearly in FIGS. 4 and 6, the side portions 54 are attached to the main portion 52 by hinges 56 and are sealed to the main portion by gaskets 58 (FIG. 6) to form a single air chamber. In this condition, the vacuum hood 16 is a horizontal flat box elongated in the transverse direction and having the primary opening 22 at its forward edge or face. The primary opening 22 extends the full height and width of the combined vacuum hood, taking the form of an essentially open mouth cut at an angle of substantially fifty degrees from the horizontal to point generally forward and toward the pavement. The auxiliary opening 24 is a relatively narrow slot formed transversely across the width of the vacuum hood 16 approximately ten inches behind the forward edge of the hood.

The vacuum hood 16 also has a pair of side doors 59 (FIG. 4) attached to the rear edge of the main portion 52 by vertical hinges 61 to close the sides of the main portion 52 when the side portions 54 are in their stowed positions. Suitable latches (not shown) are provided to hold the side doors 59 in their closed positions. When it is desired to lower the side portions 54 in order to spray and collect emissions from a wider section of the roadway, the side doors 59 are swung outwardly and rearwardly to the position shown in FIG. 4 before the side portions 54 are lowered. The side doors 59 are subsequently rotated forwardly against the rear wall of the side portions 54, in the direction indicated by the arrows 63, and held against the rear surface of the side portions 54 by latches 65. Thus, the vacuum hood 16 is usable in either its retracted position or its fully extended position, depending on the width of the roadway being sprayed, without loss of vacuum.

Referring to FIG. 5, the ductwork 18 communicates with the interior of the vacuum hood 16 through a pair of outlets 60 of the vacuum hood. The outlets are centered over a back wall 62 of the hood and have cylindrical extensions 64 which form suitable transitions to the interior of the hood 16.

The vacuum hood 16 has a plurality of baffles 66 extending substantially radially from the outlets 60 to provide more uniform air velocity over the width of the hood. The baffles extend into the side portions 54, as well as the main portion 52, to optimize air flow. Due to this configuration and the presence of the flexible flap 26, a strong flow of air into the hood is produced at all points behind the spreader bar 44, causing a large proportion of the emissions from the spraying operation to be collected.

Although the dimensions of the vacuum hood 16 can vary substantially within the broad teachings of the present invention, the following information is offered by way of illustration to explain a specific preferred embodiment of the system 10. According to this embodiment, the main portion 52 is 8 feet (2.5 meters) wide, corresponding to the width of the distributor truck, and the side portions 54 are each approximately 3 feet (0.9 meters) wide. Thus, the total width of the vacuum hood 16 in the fully extended condition is 14 feet (4.3 meters). The front-to-back dimension of the vacuum hood itself is preferably approximately 20 inches (51 centimeters), while the hood is approximately 6 inches (15 centimeters) tall. With respect to the opening sizes, the primary opening 22 is preferably between 3.5 inches (9 centimeters) and 8 inches (20 centimeters) tall, and most preferably, approximately 6 inches (15 centimeters) tall. As described above, the front of the vacuum hood is preferably cut at a 45 degree angle so that the primary opening 22 is directed forwardly and downwardly at a location above and out of contact with the pavement being sprayed. The auxiliary opening 24 is preferably a slot extending the width of the vacuum hood. It can be any width less than or equal to approximately 3 inches (8 centimeters) and is preferably 2 inches (5.2 centimeters) wide. In the embodiment in which the primary opening 22 is 6 inches (15 centimeters) tall and the auxiliary opening 24 is 2 inches (5.2 centimeters) wide, a total system air flow of 4000 cfm results in an air velocity at the primary opening of approximately 425 feet per minute. Under these conditions, ample air flow is provided behind the distributor bar 44 when the vacuum hood 16 is located approximately 8 to 20 inches (31 to 46 centimeters) above the pavement surface.

As shown in FIGS. 1–3, the vacuum hood 16 is supported vertically by a pair of hydraulic cylinders 68 which act against support braces 70 to move the vacuum hood up or down relative to the pavement surface. By adjusting the vertical position of the hood, it is possible to affect the velocity of the air directly behind the spreader bar. The ductwork 18 has a flexible section 73 which permits this movement. The vacuum hood is preferably connected to the distributor truck 14 by links 72 (FIG. 1) which provide fore and aft stability throughout its range of travel.

In addition to the primary purpose of air collection, the vacuum hood 16 is designed to support a "boot man" whose job it is to assure that liquid is sprayed uniformly from the nozzles of the spreader bar 44. For this purpose, a grating 74 is provided atop the vacuum hood 16.

Figure 8:
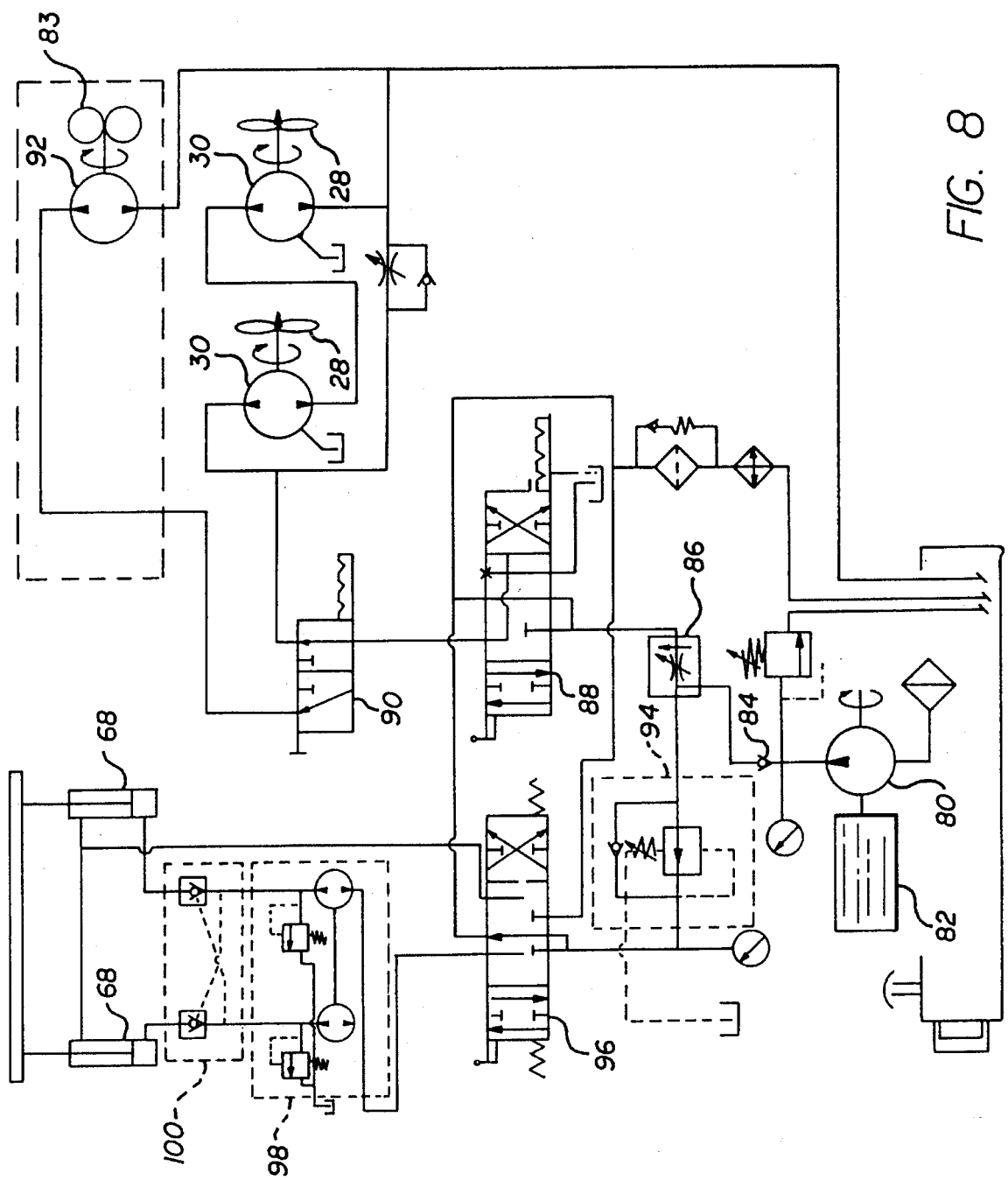
FIG. 8 is a schematic diagram of a hydraulic system of the emissions control system of the present invention.

Referring now to FIG. 8, which illustrates the hydraulic system of the present invention, power to raise and lower the hydraulic cylinders 68 and operate the fan motors 30 derives from a single hydraulic pump 80. The pump 80 is powered by a motor 82 which, in the preferred embodiment, is the prime mover of the distributor truck 14. For these purposes, the hydraulic pump 80 may be a high capacity pump substituted for the pump which normally operates a combustion blower 83 of the distributor truck's engine.

The hydraulic pump 80 provides pressurized fluid to the fan motors 30 through a check valve 84, a priority flow divider 86, a control valve 88 and a selector valve 90. The priority flow divider 86 ensures that the fan motors 30 and/or a combustion blower motor 92 receive priority over the hydraulic cylinders 68. The selector valve 90 is used to select between the combustion blower motor 92 and the fan motors 30.

Pressurized fluid from the pump 80 is also provided to the hydraulic cylinders 68 through a second outlet of the priority flow divider 86, a pressure reducing valve 94 and a directional control valve 96. Equal flow to the two cylinders is assured by a conventional divider/combiner device 98 which feeds the cylinders 68 through a dual check module 100.

In operation, the operator of the distributor truck first selects the desired height of the vacuum hood 16 and the grating 74 by operating the directional control valve 96 before spraying begins. At this time, the side portions 54 of the vacuum hood 16 are moved downwardly to their horizontal condition, if desired, as are the side portions 48 of the distributor bar 44. The fan motors 30 are then activated through the control valve 88 and spraying is begun. As the distributor truck 14 travels in a forward direction 102, air containing the emissions created by the spraying operation is drawn upwardly into the vacuum hood 16, mostly through the primary opening 22 but also through the auxiliary opening 24 behind the primary opening. The emissions-containing air is then drawn along the ductwork 18, through the filter package 20 and out to the atmosphere as clean air. Most of the sticky bituminous material contained in the air is removed by the metal mesh filters 34 of the filter package 20, after which particles down to one micron in size are extracted by the second stage filter 36 (paper) and particles down to 0.3 microns in size are extracted by the final stage filter 38 (HEPA).

Turning now to FIGS. 9A and 9B, the emissions control system 110 is shown in relation to the distributor bar 44 of the truck 14, but the truck itself is omitted for clarity. The system 110 has a main filter housing 112 which communicates with a series of fans 114 at its upper end and a vacuum hood 116 at its lower end. The fans 114 act through the filter housing 112 to create a partial vacuum within the vacuum hood 116, causing emissions-containing air to be drawn into the hood through a primary opening 118 at its forward edge and an auxiliary opening 120 toward the rear of the hood. This air is drawn through the filter housing 114 for extraction of the emissions and is expelled as clean air through discharge openings 122 of the fans 114.

The vacuum hood 116 is adjustable in width between a retracted position, shown in full lines in FIG. 9A, and an extended condition, shown in phantom lines. Throughout its range of adjustment, the vacuum hood 116 is surrounded by a shroud structure 124 depending from the periphery of the hood to substantially enclose an emissions collection region 126. The shroud structure 124 is preferably made of a plurality of flexible flaps which extend downwardly to within one or two inches of the pavement surface 128. The shroud therefore substantially surrounds the auxiliary opening 120, providing an enclosed area from which emissions can be drawn. This is important because, although most of the emissions created by spraying heated liquid from the nozzles 12 is drawn into the primary opening 118, significant additional emissions are created on the pavement surface after spraying but before the sprayed material cools. It is these emissions that are enclosed by the shroud structure 124 and evacuated by the system 110 through the auxiliary opening 120. By the time the truck 14 and the system 110 pass a specific location on the pavement surface, the material sprayed at that location has cooled considerably and no longer creates an opacity problem.

Referring now specifically to the vacuum hood 116, it is made up of a plenum portion 130 having a primary inlet portion 132 extending forwardly therefrom. The plenum portion 130 defines an open interior volume 133 of substantially uniform width over the length of the vacuum hood. The hood communicates with the filter housing 112 through a large "outlet" opening 134 and has a bottom wall 136 which slopes downwardly in the forward direction so that the height of the interior increases to a maximum near the primary inlet portion 132. The primary inlet portion has a bottom wall 138 which slopes upwardly toward the primary opening 118, and the primary opening itself is sloped forwardly and downwardly toward the pavement beneath the spray nozzles as described above in connection with the system 110 of FIGS. 1–3. This structure provides an open "head space" within the hood which allows a strong vacuum to be applied at all points along the primary opening 118 and the auxiliary opening 120, causing the flow of air into the hood to be substantially uniform along its width. In this regard, the auxiliary opening 120 has a slidable closure panel 140 at the underside of the plenum portion 130 to "fine tune" the air flow between the primary opening 114 and the auxiliary 120. The closure panel 140 is slidable forwardly and backwardly in a direction 142, as illustrated in FIG. 9B, between a pair of side rails (not shown) which frictionally engage the panel 140 to hold it in any given position of adjustment. In the illustrated embodiment, the auxiliary opening 120 is adjustable to any width up to approximately 12 inches (30 centimeters), and is preferably set at approximately 2 inches (5 centimeters) in normal operation.

As mentioned above, the vacuum hood 116 is adjustable in width to match the distributor bar 44 or the requirements of a particular job. This is accomplished in one preferred embodiment by fabricating the vacuum hood 116 of an outer housing portion 144 and a pair of interfitting side portions 146. The side portions 146 nest closely within the outer housing portion 144 and have side panels 148 which close the interior volume 134 of the vacuum hood. A pair of slide mechanisms 115, which are similar in construction to those used to mount drawers in cabinets, are provided to facilitate lateral sliding movement of the side portions 146 between the retracted full-line position and the extended phantom-line position of FIG. 9A. Suitable stop mechanisms (not shown) may also be provided to hold the side portions 146 in a particular condition of adjustment.

With reference to FIGS. 9A and 9B, it will be understood that the upper surfaces of the side portions 146 are preferably substantially continuous to avoid a loss of vacuum when the side portions are in their extended positions. These surfaces therefore block off a portion of the opening 134 between the filter housing 112 and the vacuum hood 116 when the side portions 146 are retracted. This is acceptable in the illustrated embodiment because the full filtering capacity of the system 110 is not required in the retracted condition, when a lower amount of emissions is presumably being generated. In other embodiments, which are not illustrated specifically herein, the side portions are constructed such that the opening 134 is not blocked in any way when the side portions are retracted.

The shroud structure 124 is preferably made of a series of flexible flaps extending from the periphery of the vacuum hood 116 to a location slightly above the pavement surface. Thus, the shroud structure 124 has a main rear flap 152 extending from the rear of the outer housing portion 144, and a main front flap 154 extending from the lower edge of the primary opening 118. Likewise, each of the side portions 146 of the vacuum hood preferably have flaps 156 at their forward, rear and outer edges. The flaps 156 at the rear of the side portions are disposed parallel to and immediately adjacent the main rear flap 152, permitting them to slide inwardly and outwardly with the side portions 146. The flaps 156 at the forward ends of the side portions are also preferably positioned parallel to and immediately adjacent the main front flap 154 for sliding movement. This causes the emissions collection region 126 beneath the vacuum hood 116 to be substantially enclosed or isolated from the atmosphere for all conditions of lateral adjustment, maximizing the effectiveness of the auxiliary opening 120 in removing emissions from the area above the pavement surface as the sprayed material cools.

The flaps 152, 154 and 156 are all preferably made of rubber or a rubber-like sheet material attached to the edges of the vacuum hood 116. Attachment can be accomplished by any suitable means, such as a series of flexible straps 158, as illustrated in the drawings. Alternatively, the flaps can be attached using screws or other suitable fasteners. In either case, any gap between the shroud structure 124 and the vacuum hood 116 must be kept to a minimum to avoid loss of vacuum within the collection region 126.

The filter housing 112 preferably contains at least two stages of filter media, identified in FIG. 9B as primary (coarse) filters 160 and secondary (fine) filters 162. In a preferred embodiment, the primary filters 160 are preferably of the metal mesh type, similar to the first stage 34 of the system 10, and the secondary filters 162 are of the HEPA type, similar to the final stage 38 of the system 10. Operation of the filters 160 and 162, as well as the fans 114, is identical to that described in connection with the system 10.

The system 110 derives much of its structural strength from a pair of I-beams 164 extending through the vacuum hood 116 along the entire length of the system 110. These I-beams are preferably perforated within the vacuum hood 116 to avoid adversely affecting air flow therein, but are omitted from FIG. 9B for clarity. They are mounted to the truck 14 (not shown) by an overhead framework 166 which is supported for vertical sliding movement relative to sleeves 168 of the truck. The vertical height of the system 110 relative to the truck is then controlled by a pair of hydraulic cylinders (not shown) acting between the overhead framework 166 and the sleeves 168. These cylinders may be powered by a hydraulic system similar to that described above in connection with the system 10. A platform 170 is also provided over the primary inlet portion 132 of the vacuum hood to support an operator whose job it is to assure that the nozzles of the distributor bar are not obstructed.

In operation, the system 110 functions in a manner similar to that described above in connection with the system 10, and is particularly advantageous in applications requiring collection of a very large proportion of the emissions created by a spraying operation. It is especially useful when continuing emissions from a mat of sprayed material is of concern. As the distributor truck travels in a direction 172, emissions created by initial exposure of heated, sprayed material with the surrounding air and the pavement surface are drawn into the vacuum hood 116 through its primary opening 118. When high temperature materials are sprayed, however, the "mat" of sprayed material often continues to generate substantial emissions until it cools to a temperature of approximately 200° F. or below. In the spraying of asphalt-rubber, these emissions can contribute undesirably to opacity and should be collected, where possible. The system 110 solves this problem by enclosing the emissions collection region 126 beneath the vacuum hood and evacuating it by drawing air through the auxiliary opening 120 until the entire system 110 has moved beyond a particular point on the pavement surface. By this time, the temperature of the mat at that point is greatly reduced and the emissions from it are no longer a significant problem. The flow of emissions into the hood 116 for eventual collection by the filters 160 and 162 is indicated by arrows in the drawing of FIG. 9B.

Although the dimensions of the vacuum 116 can vary substantially, the following information is offered to illustrate a specific preferred embodiment of the system 110. According to this embodiment, the vacuum hood 116 varies in width from a minimum of eight feet (2.5 meters) or ten feet (3 meters) in the retracted condition to a maximum of approximately fourteen feet (4.3 meters) in the fully extended condition. The vacuum hood 116 also varies from a minimum height of approximately 11 inches (27.9 centimeters) at its rearward end to a maximum of 28 inches (71.1 centimeters) at the forward end of the plenum portion 130. The primary opening 118 is preferably a slot extending the width of the vacuum hood and having essentially the dimensions described above in connection with the system 10. The vacuum hood itself is preferably located eight to twenty inches (20 to 30 centimeters) above the pavement surface at its lowest point, and the height of the flaps 152, 154 and 156 vary accordingly to locate that the lower edges of the flaps approximately two inches or less (5.0 centimeters or less) from the mat. With these dimensions, and with fans similar to those described in connection with the system 10, the system 110 is capable of generating uniform air flows of approximately 24,000 cfm at the primary opening 118 and the secondary opening 120, and drawing air into the hood at a velocity range of approximately 3,000 to 6,000 feet per minute.

The emissions control system 210 illustrated in FIGURES 10A and 10B is similar to that of the system 110 except that exhaust air conduits 212 are provided for directing a first stream of pressurized air forwardly into the emissions collection region 126 and/or a second stream of pressurized air rearwardly and downwardly onto the sprayed pavement surface behind the system 210. In addition, a water spray system 214 sprays a fine mist of water from the rear of the system 210 toward the pavement surface.

Referring first to the streams of pressurized air, a plenum 216 is provided over the discharge openings 122 of the rear pair of fans 114 to capture "clean" air exhausted by the fans and redirect it along a plurality of hoses 218 to a discharge portion or "duct" 220 mounted to the rear of the vacuum hood 116. Pressurized air exits the discharge portion 220 through a series of forward slots 222 directed toward the interior of the emissions collection region 126, and a series of rearward slots 224 located outside the emissions collection region. The slots 222 direct air downwardly and forwardly, substantially toward the auxiliary opening 120, to minimize the escape of emissions-containing air from the enclosed collection region 126. This air stream acts in conjunction with the vacuum created within the hood 116 to enhance the efficiency and effectiveness of the collection process. It operates in a "push-pull" fashion, similar to air curtains sometimes used to minimize the escape of heated or cooled air from open windows of building structures. The rearward slots 224 are directed downwardly and rearwardly to disperse any emissions which might escape the system 210 and any continuing emissions from the pavement mat itself. In addition, the air directed by the rearward slots 224 has been found to assist in cooling the pavement mat, further reducing any residual emissions therefrom.

In a preferred embodiment, the hoses 218 are preferably approximately five inches (12.5 centimeters) in diameter and the discharge portion 220 may be a circular conduit eight inches (20.0 centimeters) in diameter. The slots 222 and 224 are then between one and two inches (between 2.5 and 5.0 centimeters) wide along the curved surface of the discharge portion 220 and are aligned laterally to act essentially as a single, continuous slot.

The water spray system 214 is made up of a series of water lines 226 connected to a suitable source of pressurized water (not shown) and terminating in a plurality of water nozzles 228. These nozzles create a fine mist of water, substantially "atomizing" the water and directing it downwardly toward the pavement surface. In this finely dispersed form, the water does not adversely affect the sprayed pavement mat, but rather aids in cooling the mat and extracting residual emissions from the air outside the collection region 126. When an extremely fine spray of water is used, the water tends to mix with the pressurized air exhausted through the rearward slots 224 of the discharge portion 220, forming a stream of moist or humid air which is particularly well-suited for extracting emissions.

The system 210 operates in a manner similar to the system 110 of FIGS. 9A and 9B, except that the addition of the one or more air streams from the discharge portion 220 and the fine mist of water from the water spray nozzles 228 further facilitates the emissions control process. Thus, the system 210 is particularly well-suited for extracting emissions-containing air from a region in which heated paving material is sprayed, as well as dealing with the problem of residual emissions from the mat on the pavement surface.

Referring now to FIGS. 11A and 11B, the system 310 preferably has a vacuum assembly 312 which is similar to the fans 114, the filter housing 112 and the vacuum hood 116 of the system 110, but is located ahead of the distributor bar 44 rather than behind it. In order to draw emissions from the area of the bar, the vacuum assembly 312 is turned around so that its primary opening 118 faces rearwardly. The system is suspended from the rear of the distributor truck 14 by a framework 314 to draw emissions-containing air through its primary opening 118, and the secondary opening 120 is omitted. The system 310 is provided with an air discharge portion 316 for directing a stream of pressurized air forwardly and somewhat downwardly from a location behind the distributor bar 44 to assist in collecting emissions. Although this stream of air can be generated by any suitable source, it is preferably and most efficiently taken from the stream of clean air exhausted by the fans 114 through an overhead series of ducts 318. An exhaust air plenum 320 is provided between the fans for this purpose. Because of the need for an operator near the nozzles 12, a platform 322 is preferably provided above the air discharge portion 316. This platform is supported by additional support members (not shown) associated with the ducts 318.

In a preferred embodiment, the ductwork leading to the air discharge portion is approximately five inches (12.5 centimeters) in diameter, and the outlet opening of the air discharge portion is preferably between 0.5 and 1.5 inches (1.25 to 3.75 centimeters) wide, most preferably approximately 1.0 inches (2.5 centimeters) wide. The air discharge portion may, of course, be built into the underside of the platform 322 and may direct pressurized air toward the distributor bar 44 at substantially any desired angle.

As described above in connection with the system 210, the stream of pressurized air from the air discharge portion 316 acts in conjunction with the stream of intake air at the primary opening 118 in a push-pull fashion. This enhances the efficiency of the collection process, particularly in the system 310 wherein emissions-containing air is drawn from a position ahead of the distributor bar 44 rather than behind it.

Although the systems 10, 110, 210 and 310 are all shown as having filter structures disposed between a vacuum hood and a fan mechanism, it should be understood that the filters can be positioned downstream of the fan mechanisms, if desired. The only reason for placing the filters upstream of the fans is to keep sprayed material from building up within the fans.

From the above, it can be seen that the system of the present invention dramatically reduces the particulate contamination created when bituminous materials, such as heated asphalt-rubber compositions, are applied by a distributor truck or similar vehicle. Significantly, this function is accomplished without restricting the ability of a "boot man" to ride on the rear of the distributor truck and without impeding his access to the distributor nozzles during use. The spraying operation proceeds just as before, except that the emissions are collected.

The following claims are, of course, not limited to the embodiments described herein, but rather are intended to cover all variations and adaptations falling within the true scope and spirit of the present invention.

What is being claimed:

1. A system for controlling emissions created by spraying a heated liquid paving composition from at least one nozzle of a moving vehicle onto a pavement surface, comprising:

a vacuum hood positionable adjacent said at least one nozzle and having at least one inlet and at least one outlet;

a shroud structure associated with the vacuum hood to at least partially enclose an emissions collection region above the pavement surface;

a mechanism communicating with said at least one outlet to create a partial vacuum within the vacuum hood and draw air from the emissions collection region through said at least one inlet; and apparatus for receiving said air and extracting emissions therefrom.

2. The system of claim 1 wherein:

said mechanism comprises a fan mechanism.

3. The system of claim 1 wherein:

the vacuum hood has a forward end and a rearward end; and said at least one inlet comprises a primary opening adjacent said forward end and an auxiliary opening disposed behind the primary opening; and the shroud structure substantially surrounds the auxiliary opening.

4. The system of claim 1 wherein:

the shroud structure comprises a plurality of flexible flaps depending from the vacuum hood.

5. The system of claim 1 wherein:

the vacuum hood extends transversely across the vehicle.

6. The system of claim 5 wherein:

the vacuum hood defines an interior volume of substantially uniform width.

7. The system of claim 6 wherein:

the vacuum hood is substantially as wide as said at least one inlet.

8. The system of claim 6 wherein:

the vacuum hood has at least one side panel movable laterally to adjust the width of said at least one inlet and said interior volume.

9. The system of claim 8 wherein:

said at least one side panel moves telescopically.

10. The system of claim 8 wherein:

a portion of the shroud structure moves laterally with said at least one side panel.

11. The system of claim 1 wherein:

the auxiliary opening is a transverse slot in the vacuum hood.

12. The system of claim 11 wherein:

the front-to-back dimension of the auxiliary opening is adjustable.

13. The system of claim 1 wherein:

the filter structure has at least one preliminary stage for extracting relatively large particulate matter and at least one subsequent stage for extracting extremely fine particulate emissions.

14. A method for controlling emissions created by spraying a heated liquid paving composition from at least one nozzle of a moving vehicle onto a pavement surface, comprising:

providing a vacuum hood adjacent said at least one nozzle and above the pavement surface, the vacuum hood having at least one inlet and at least one outlet;

providing a shroud structure associated with the vacuum hood to at least partially enclose an emissions collection region above the pavement surface;

spraying the heated liquid paving composition from said at least one nozzle as said vehicle moves;

creating a partial vacuum within the vacuum hood to draw air from said emissions collection region through said at least one inlet;

extracting emissions from said air; and exhausting to the atmosphere air from which said emissions have been extracted.

15. A system for controlling emissions created in a preselected region by spraying a heated liquid paving composition from at least one nozzle of a moving vehicle onto a pavement surface, comprising:

a vacuum hood positionable adjacent said at least one nozzle and having at least one inlet and at least one outlet;

at least one fluid conduit having a discharge portion directed substantially toward said preselected region;

a mechanism for moving air having:
  a first portion communicating with said at least one outlet to create a partial vacuum within the vacuum hood and draw air containing said emissions through said at least one inlet; and
  a second portion communicating with said at least one fluid conduit to direct pressurized air substantially toward said preselected region; and apparatus for receiving the air drawn into the vacuum hood and extracting emissions therefrom.

16. The system of claim 15 wherein:

said mechanism for moving air includes a fan mechanism, the first portion comprising a suction side of the fan mechanism and the second portion comprising a pressure side of the fan mechanism.

17. The system of claim 15 wherein:

the vacuum hood is disposed behind said at least one nozzle;

the vacuum hood has a forward end and a rearward end; and said at least one inlet comprises a primary opening adjacent said forward end.

18. The system of claim 17 wherein:

the vacuum hood has an auxiliary opening disposed behind the primary opening; and the discharge portion of said at least one fluid conduit is disposed behind the auxiliary opening and oriented to direct air substantially toward the auxiliary opening.

19. The system of claim 17 wherein:

the discharge portion of said at least one fluid conduit is located behind the primary opening of the vacuum hood and is directed downwardly and rearwardly to disperse emissions which are not drawn into the vacuum hood.

20. The system of claim 15 wherein:

the vacuum hood is located ahead of said at least one spray nozzle;

the vacuum hood has a forward end and a rearward end; and said at least one inlet comprises a primary opening adjacent said rearward end.

21. The system of claim 20 wherein:

said at least one fluid conduit has a discharge opening disposed behind said at least one nozzle.

22. The system of claim 21 wherein:

said discharge portion is directed downwardly and forwardly to direct emissions-containing air toward the vacuum hood.

23. The system of claim 15 which further comprises:

a shroud structure associated with the hood structure to at least partially isolate an emissions collection region above the pavement surface.

24. The system of claim 23 wherein:

the shroud structure comprises a plurality of flexible flaps depending from the vacuum hood.

25. The system of claim 15 wherein:

the vacuum hood extends transversely across the vehicle.

26. The system of claim 25 wherein:

the vacuum hood defines an interior volume of substantially uniform width.

27. The system of claim 26 wherein:

the vacuum hood is substantially as wide as said at least one inlet.

28. The system of claim 26 wherein:

the vacuum hood has at least one side panel movable laterally to adjust the width of said at least one inlet and said interior volume.

29. The system of claim 28 wherein:

said at least one side panel moves telescopically.

30. The system of claim 28 wherein:

a portion of the shroud structure moves laterally with said at least one side panel.

31. The system of claim 15 wherein:

said apparatus for receiving air and extracting emissions therefrom comprises a filter structure.

32. A system for controlling emissions created in a preselected region by spraying a heated liquid paving composition from at least one nozzle of a moving vehicle onto a pavement surface, comprising:

means located adjacent said at least one nozzle for collecting air containing said emissions from said preselected region;

means for drawing said air from said collecting means;

means for directing pressurized air toward said preselected region; and means for receiving air drawn into said collection means and extracting emissions therefrom.

33. A method for controlling emissions created in a preselected region by spraying a heated liquid paving composition from at least one nozzle of a moving vehicle onto a pavement surface, comprising:

providing a vacuum hood adjacent said at least one nozzle and having at least one inlet and at least one outlet;

providing at least one fluid conduit having a terminal portion directed toward said preselected region;

spraying the heated liquid paving composition from said at least one nozzle as the vehicle moves;

creating a partial vacuum within the vacuum hood to draw air containing emissions from the spraying operation through said at least one inlet;

passing pressurized air through said at least one fluid conduit and toward said preselected region;

extracting emissions from air drawn into the vacuum hood; and exhausting to the atmosphere air from which said emissions have been extracted.

34. A system for controlling emissions created by spraying a heated liquid paving composition from at least one nozzle of a moving vehicle onto a pavement surface, comprising:

a vacuum hood positionable adjacent said at least one nozzle, said vacuum hood having at least one inlet and at least one outlet;

a mechanism communicating with said at least one outlet to create a partial vacuum within the vacuum hood and draw air containing said emissions through said at least one inlet;

apparatus for receiving said air and extracting said emissions therefrom; and a subsystem for exposing at least some of the air adjacent the vacuum hood to water.

35. The system of claim 34 wherein:

said subsystem includes at least one nozzle for spraying a fine mist of water into the air.

36. The system of claim 34 wherein:

said subsystem includes a mechanism for creating a moist stream of air adjacent the vacuum hood.

37. A method for controlling emissions created by spraying a heated liquid paving composition from at least one nozzle of a moving vehicle onto a pavement surface, comprising:

providing a vacuum hood adjacent said at least one nozzle, the vacuum hood having at least one inlet and at least one outlet;

spraying the heated liquid paving composition from said at least one nozzle as the vehicle moves;

creating a partial vacuum within the vacuum hood to draw air containing emissions from the spraying operation through said at least one inlet;

extracting emissions from said air;

exhausting to the atmosphere air from which said emissions have been extracted; and exposing at least some of the air adjacent the vacuum hood to water.

38. The method of claim 37 wherein:

the step of exposing at least some of the air adjacent the vacuum hood to water comprises spraying a fine mist of water into the air.

39. The method of claim 37 wherein:

the step of exposing at least some of the air adjacent the vacuum hood to water comprises creating a moist stream of air adjacent the vacuum hood.

* * * * *

UNITED STATES PATENT AND TRADEMARK OFFICE
CERTIFICATE OF CORRECTION

PATENT NO. : 5,470,176
DATED : November 28, 1995
INVENTOR(S) : Corcoran et al.

It is certified that error appears in the above-indentified patent and that said Letters Patent is hereby corrected as shown below:

Column 8, line 6, after "auxiliary", insert --opening--;

Column 10, line 8, after "locate", delete "that".

Signed and Sealed this

Twenty-fourth Day of September, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,470,176
APPLICATION NO. : 08/248501
DATED : November 28, 1995
INVENTOR(S) : John Corcoran et al.

Page 1 of 1

It is certified that error appears in the above-identified patent and that said Letters Patent is hereby corrected as shown below:

On the Title Page,

Item [*] Notice    Delete "The portion of the term of this patent subsequent to August 30, 2011, has been disclaimed" and
Insert --The portion of the term of this patent subsequent to January 5, 2013, has been disclaimed--

Signed and Sealed this
Nineteenth Day of April, 2011

David J. Kappos
*Director of the United States Patent and Trademark Office*